US009234737B2

(12) United States Patent
Hakkinen et al.

(10) Patent No.: US 9,234,737 B2
(45) Date of Patent: Jan. 12, 2016

(54) METHOD FOR MEASURING AND ALIGNING A ROTARY CYLINDRICAL APPARATUS

(75) Inventors: Teemu Hakkinen, Savonlinna (FI);
Heikki Iivarinen, Savonlinna (FI);
Pertti Kaikkonen, Savonlinna (FI);
Tuomo Lintunen, Savonlinna (FI)

(73) Assignee: Andritz Oy, Helsinki (FI)

(*) Notice: Subject to any disclaimer, the term of this patent is extended or adjusted under 35 U.S.C. 154(b) by 853 days.

(21) Appl. No.: 13/509,510

(22) PCT Filed: Nov. 4, 2010

(86) PCT No.: PCT/FI2010/050891
§ 371 (c)(1),
(2), (4) Date: Jul. 30, 2012

(87) PCT Pub. No.: WO2011/058221
PCT Pub. Date: May 19, 2011

(65) Prior Publication Data
US 2012/0290258 A1 Nov. 15, 2012

(30) Foreign Application Priority Data

Nov. 11, 2009 (FI) .................................. 20 096175

(51) Int. Cl.
*G01B 7/30* (2006.01)
*G06F 15/00* (2006.01)
(Continued)

(52) U.S. Cl.
CPC . *G01B 7/281* (2013.01); *F27B 7/26* (2013.01);
*F27B 7/42* (2013.01); *F27D 19/00* (2013.01);
*F27D 21/00* (2013.01); *F27D 21/04* (2013.01);
*G01B 21/20* (2013.01)

(58) Field of Classification Search
CPC .............. F27B 7/26; F27B 7/42; F27D 19/00;
F27D 21/00; F27D 21/04; G01B 11/27;
G01B 11/245; G01B 11/2433; G01B 21/20;
G01B 7/281
USPC .............. 702/95, 97, 151–153, 155; 356/375,
356/614

See application file for complete search history.

(56) References Cited

U.S. PATENT DOCUMENTS 5,491,553 A * 2/1996 Gebhart ....................... 356/614
7,110,910 B1   9/2006 Deffenbaugh et al.

FOREIGN PATENT DOCUMENTS

| CA | 2 028 505 | 4/1992 |
|----|-----------|--------|
| EP | 0 420 663 | 4/1991 |
| JP | 61-38512  | 3/1986 |
| JP | 61-219821 | 9/1986 |
| JP | 62-34002  | 2/1987 |
| JP | 3-194404  | 8/1991 |
| JP | 06-159942 | 6/1994 |
| JP | 8-304037  | 11/1996 |

(Continued)

OTHER PUBLICATIONS

International Search Report mailed Mar. 16, 2011.

*Primary Examiner* — John H Le
(74) *Attorney, Agent, or Firm* — Nixon & Vanderhye P.C.

(57) ABSTRACT

A method for measuring and aligning a rotary cylindrical or other rotationally symmetrical apparatus, such as a kiln or a drum. The apparatus to be measured and aligned has a shell and at least one supporting ring. As the rotary apparatus is rotating under process conditions, measurement points are measured on the surface of the rotating object's shell in the axial direction on both sides of each supporting ring on the same circumferential line. Regression circles are calculated from the measured points, center points are determined for the calculated circles and a straight line and its center point are determined between the center points of the circles calculated on both sides of each supporting ring. A reference straight line is calculated for the center line of the shell and the object's shell is aligned to be straight by transferring the determined center points of the shell to the calculated reference line.

11 Claims, 3 Drawing Sheets

(51) Int. Cl.
- *G01B 7/28* (2006.01)
- *F27B 7/26* (2006.01)
- *F27B 7/42* (2006.01)
- *F27D 19/00* (2006.01)
- *F27D 21/00* (2006.01)
- *F27D 21/04* (2006.01)
- *G01B 21/20* (2006.01)

(56) References Cited

FOREIGN PATENT DOCUMENTS

| | | |
|---|---|---|
| JP | 10-38531 | 2/1998 |
| JP | 2008-170151 | 7/2008 |
| RU | 2 235 888 | 9/2004 |
| SU | 1046613 | 10/1983 |

* cited by examiner

METHOD FOR MEASURING AND ALIGNING A ROTARY CYLINDRICAL APPARATUS

RELATED APPLICATION

This application is the U.S. national phase of International Application No. PCT/FI2010/050891 filed 4 Nov. 2010 which designated the U.S. and claims priority to 20096175 filed 11 Nov. 2009, the entire contents of each of which are hereby incorporated by reference.

BACKGROUND

The present invention relates to a method of and apparatus for measuring and aligning a rotary cylindrical or other rotationally symmetrical apparatus, e.g. in the form of a truncated cone. The rotationally symmetrical apparatus can be e.g. a kiln, such as a lime kiln or a cement kiln, or a drum, used in the chemical pulp industry.

Aligning a rotary cylindrical apparatus, such as a kiln or a drum, refers in this connection to straightening of the shell thereof, e.g. in order to keep the bricks in place in the kiln and for ensuring the desired functioning. In practice this means transferring the center points of the shell of a rotary object to a common straight line at the location of its supporting points. Adjustment of a rotary apparatus, in its turn, commonly refers to changing the declination angles of the support rollers of the rotary apparatus in respect of the center line of the apparatus. The adjustment aims at decreasing the wearing of mechanical parts and at desired functioning of the apparatus.

It is known from the state of art to align a rotary apparatus using e.g. the arrangement of FI utility model 8330 comprising i.a. orientation points fixed around the apparatus, measurement points fixed in connection with the support rings, measurement points fixed in connection with support rollers meant for supporting the support rings and at least two station points for setting the measuring device to said station point, and further apparatuses. Thus, the solution according to said publication utilizes, in addition to a measuring device, also a measurement point physically fixed in the object of measurement. The measurement point can be e.g. a target, an adhesive, a prism or a bar. In the solution according to said publication the object is measured when it is cold.

U.S. Pat. No. 5,491,553, in turn, presents an arrangement for measuring a kiln where the measuring device is fixed on a base that is located under the kiln for the measurement. The measuring device in the publication comprise three semiconductor lasers.

In the prior art solutions, such as e.g. in publication FI 8330, a drum-like object is measured stationary, i.e. cold. However, measuring of a cold kiln or drum does not give a right result, but the geometry of the kiln or drum changes during operation due to e.g. thermal expansion. In prior art, the thermal expansion is not always taken into account at all, but aligning is performed in accordance with the geometry of a cold kiln or drum. Then the alignment may differ even remarkably from the correct alignment. Further, taking thermal expansion into account during aligning is very troublesome and it is usually impossible to perform it exactly. And, a problem that arises in measuring a cold kiln or drum is that during the measurement and aligning the kiln or drum has to be kept out of operation. In practice this means that the measurement and aligning are to be performed during shut-down, when many repair and maintenance operations are performed at the mill. Scheduling the measurement and aligning with the other operations can be very difficult.

Another problem in the known solutions is caused by the aim to align the shell of the apparatus in a so-called indirect way, e.g., by measuring for instance the diameters of the support rollers, the distance between the support rollers, the diameter of the support rings, relative differences in altitude of the bases of the support rollers, the clearances of the casing and support ring etc. Such an indirect cold measuring is clearly more unreliable than measuring during the operation of the kiln, because the temperatures vary at different piers. For this reason, the clearance between the shell and the ring does not remain the same, but the center line of the kiln changes. According to prior art, the clearance is measured through backward slip, but the measurement is not totally reliable, as the slip changes a bit due to e.g. rotational speed.

In the solution according to said US-publication, locating the measuring device below the object to be measured is troublesome and time consuming. Additionally, the equipment that is needed is weighty. For these reasons, the measurement is carried out on one side of the support ring only. Further, the measurement is carried out below the shell on one side only, whereby it is not even possible to effect the measurement in close vicinity of the support ring because of the support rollers located below the support ring. An additional problem in the technique according to said US-publication is the narrowness of the sector on which the measurement points can be measured. A narrow measuring sector gives an unreliable result. Further, the shape of the shell changes the least on the lower side, which further increases the unreliability of the measuring result.

SUMMARY OF INVENTION

The present invention provides a solution for the above problems. According to the present invention, a novel solution has been developed for measuring and aligning a rotary cylindrical apparatus.

The invention is determined more precisely in the appended claims.

According to an embodiment of the present invention, the geometry of a rotary object is measured during operation. The measurement results allow aligning the object and thereafter checking the alignment by re-measurement. To be more exact, an object of the embodiment of the invention is to determine the geometry of the object during operation by forming a three-dimensional model of the measurement points, by means of which it is possible e.g. to determine the shell's center points at the supporting points with respect to each other.

The measurement requires an equipment, by means of which it is possible to create a model of the object in a three-dimensional coordinate system by means of the measurement points. According to an embodiment of the invention, the measurement uses an apparatus that is capable of measuring the measurement point directly from the surface of the object being measured without any target, such as an adhesive, a prism or a bar. In practice, the measurement can be carried out with either an electronic tachometer or a 3D-scanner. In addition, a software is needed in the measuring and the subsequent alignment of the kiln or drum, by means of which a 3-dimensional model of the object of measurement can be created based on the measurement points.

For the measurement, an orientation point network is created around the kiln, which allows orientating the measuring device in a free or known station point in a desired coordinate system. Thus, the measuring device can be located in an easily accessible location, e.g. at a very stabile location in the surroundings of the object to be measured, and there is no need to locate it in a tight or otherwise inconvenient place, e.g. below the object to be measured.

Usually, when a rotary object is measured, a free station point is used. The orientation points are to be located in the surroundings of the object so that at least two orientation points are observable from each planned free station point. All orientation points can be determined in a desired system of coordinates from one point, in order to be able to later determine the free station point with maximum accuracy.

The aim of the measurement is to measure the center point of a rotating object at the support rings and the direction of the axes of the support rollers in relation to the calculated center line of the shell. An adequate number of measurement points are measured on the shell of the rotating object from the upper side and from the lower side, i.e. in the axial direction on both sides at equal distances on the same line and at the same distance from the support ring so that the measurement points cover an adequate sector of the shell on both sides of each support ring. An adequate number of measurement points for reaching the required accuracy of measurement is case-dependent. According to the embodiment of the invention, the number of measurement points is at least three. Good results are reached with e.g. approximately ten measurement points. Naturally, the accuracy increases along increasing number of measurement points. When scanning the shell of the object being measured and aligned, the measurement points occur at even intervals and their number is preferably approximately 20-60. The upper side (US) refers to the side of the support ring, from where the material to be treated is fed into the kiln or drum and the lower side (LoS) refers to the side from where the material is discharged from the kiln or the drum. In other words, the product moves inside the kiln or drum from above downwards. A rotating object is measured from one side of the shell at minimum. According to the embodiment of the invention, the measurement is effected on the shell of the rotating object preferably on at least two sides.

In accordance with an embodiment of the invention, the object rotates during the measurement at least once, whereby the measurement points cover all possible positions of motion of the shell of the kiln or drum. The measuring lines are located as close to the support ring as possible and at equal distances from the ring on both sides thereof as shown in FIG. 1. Measuring lines are created on the support rollers both on the upper and the lower side on the surface of the roller and from them an adequate number of points, e.g. approximately 60 points, are measured at even spacing. The axial thrust rollers can be measured using one measuring line only, because it is necessary to determine the center points of the axial thrust rollers in relation to the center line of the kiln.

The measured measurement points are transmitted to a computer, where the actual analysis and calculation of the results is performed. By means of the program, circular regression, i.e. best fit circle for all the measuring points is calculated from the points measured on the measuring lines. Coordinates are determined for the center points of the calculated circles in a three-dimensional system of coordinates. After this, a line segment is determined between the center points of the circles calculated on both sides of the support rings of each pier and coordinates are determined for the center point of this line segment. In this way, the coordinates of the shell's center point can be determined from the center of the support ring highly accurately. The corresponding calculations are carried out for the support rollers. That is, first the best fit circles are calculated from the measurement points and center point coordinates determined for them, after which a straight line is determined between the center points.

When the center point coordinates of the shell have been determined from the center of the support rings as mentioned in the above, a reference straight line can be calculated for the shell's center line. The reference straight line can be determined as a regression straight line either by taking into account the coordinates of the center points of all piers or by fixing the coordinates of the center point of one pier onto the straight line. The reference straight line can also be determined by fixing the center points of two piers as a straight line. After this it is possible to calculate the vertical and horizontal distances of the shell's center points to the determined reference straight line. Additionally, based on the reference straight line the declination angle of the object is known and can be compared to the designed declination angle. As to the support rollers, the vertical and horizontal declination angles thereof can be determined with respect to the calculated reference straight line of the object's shell, as well as the center points of the rollers' axes. By means of the calculated values the shell of the object can be aligned straight by transferring the center points of the line segments located between the center points of the calculated circular regressions to the calculated reference line. These center points for the line segments are the same as the center points of rotation of the shell. The calculation can be effected utilizing the determined center points of the support rollers' axes, or alternatively it is also possible to measure the diameters of the support rollers and the support rings, the distance between the support rollers and the clearance between the shell and the support roller, based on which the geometry required for the alignment can be solved mathematically. Additionally, the vertical declination angles of the support rollers can be adjusted to correspond to the declination angle of the shell, if needed. When the required transfers have been made, a control measurement can be effected.

Additional advantages of embodiments of the invention include the following:
- the measurement is done easily and quickly during operation,
- the equipment required for the measurement is light-weighted and easily supported by one person,
- very exact measuring result, which provides good alignment and better operability of the kiln or drum,
- the measuring result can be verified by means of a re-measurement,
- the measuring and the aligning can be performed during operation, whereby there is no need for a shut-down,
- adjustments can be anticipated and problem situations avoided, and
- the described measuring method eliminates risk factors in the measurements compared to old methods of measuring the support roller basis levels. These risk factors, especially with regard to journal bearings, include e.g. uneven wear of journal bearing halves and dimension differences between journal boxes.

SUMMARY OF DRAWINGS

In the following, the invention is disclosed in more detail with reference to the appended drawings, of which

FIG. 1 illustrates a solution according to a preferred embodiment of the invention, showing a part of a shell 10 of a drum or kiln being aligned, a support ring 20, support rollers 30, a measuring device 40, upper side 70 and lower side 80 of the support ring and the left side (LS) 90 and the right side (RS) 100 of the shell. On both sides of the support ring measuring lines 50 are determined, from which the measurement points are measured. The measured measurement points are transmitted from the measuring device via a data transfer line to a computer 190, e.g. a PC-based apparatus, which produces a three-dimensional model of the apparatus and performs the actual analyzing and calculation of the results that is required for the alignment. By means of the program, circular regressions are calculated from the measured points. Coordinates are determined for the center points of the calculated circles in a 3-dimensional system of coordinates. After this, a line segment 110 is determined between the center points of the circles calculated on both sides of the support rings 20 of each pier and coordinates are determined for the center point 60 of this line segment. In this way, the coordinates of the shell's 10 center point of rotation 60 can be determined from the center of the support ring 20 highly accurately. The corresponding calculations are carried out for the support rollers 30. That is, first the best fit circles are calculated from the measurement points and center point coordinates determined for them, after which a line segment is determined between the center points and a center point 120 for said line segment.

FIG. 2 illustrates the actual profile of the shell in the measuring line and the center point 170 of rotation. Continuous lines 130 illustrate the shape of the shell during rotation. The center point 170 of the circle 180 calculated in accordance with the invention, as described in the above, illustrates the center point of rotation of the shell, not the geometric center point 140. The rotation center point 170 is determined by forming a circular regression 180 from an adequate number of measurement points 160 measured from the measuring line 50 along a sector 150 of adequate size, the center point of which circular regression illustrates the average center point of rotation of the shell. As a shell of a kiln or drum, especially when hot, has a known tendency to dent at the support rollers as well as from above during rotation, the actual shape of the shell is not circular, but predominantly oval. Further, the shell can move slightly radially during rotation, so that by measuring the shell during rotation, the average rotation center point 170 of the shell is obtained in accordance with FIG. 2.

FIG. 3 illustrates an example of the location of the orientation points and a free station point in the surroundings of the object. The FIG. 3 shows a rotating cylindrical apparatus, e.g. a kiln or a drum 300. It is carried by support rings 20 supported upon support rollers 30, the middlemost of which support rings is surrounded by shown axial thrust rollers 220. The axial thrust rollers can also be measured and aligned. According to the invention, at least one axial thrust roller 220 is measured by creating a measurement line on the surface of each roller and measuring measurement points on at least one side. Circular regressions are calculated from these measurement points and center points are defined for the circular regressions that illustrate the center point of the axial thrust rollers. The axial thrust rollers are aligned to the same straight line with the shell of the kiln by transferring the center point of the circular regression calculated from the axial thrust roller as seen from above to the regression straight line illustrating the shell.

Additionally FIG. 3 illustrates a line 210 that in a simplified way illustrates the actual measured center line of the kiln, and a reference straight line 200. The reference straight line 200 can be determined as a regression straight line either by taking into account the coordinates 60 the center points of all piers or by fixing the coordinates of the center point of one pier onto the straight line. The figure also illustrates a number of orientation points 240, which have allowed determining the free station points (FSP) 230 and the measured center lines 250 of the support rollers' axes.

Figure 1:
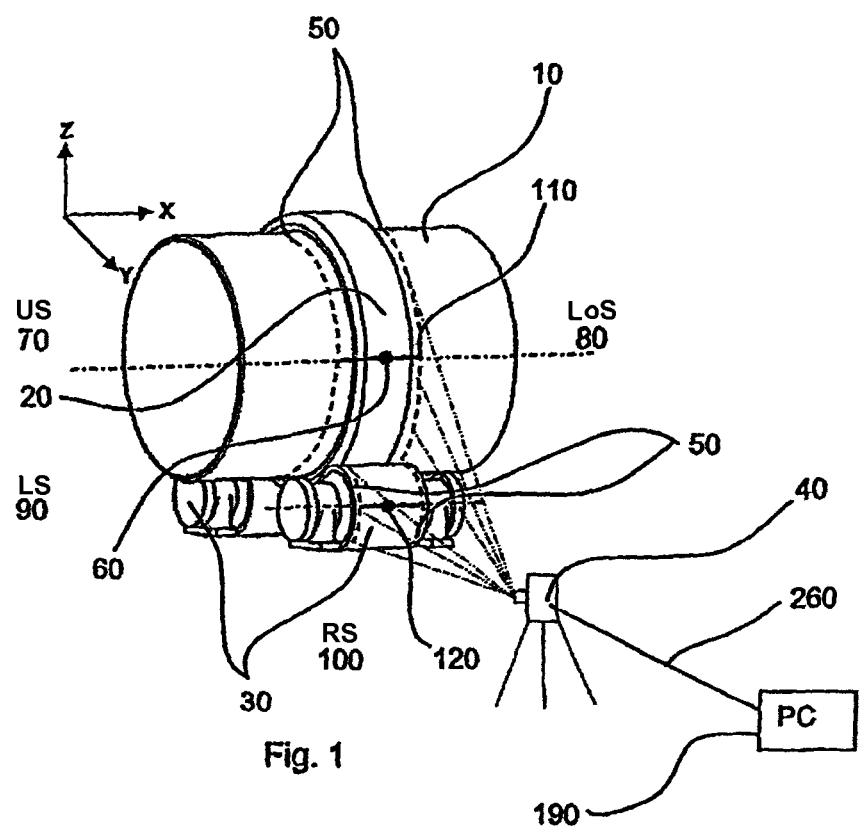
FIG. 1 illustrates a solution for measuring the shell of a rotating cylindrical object.
Figure 2:
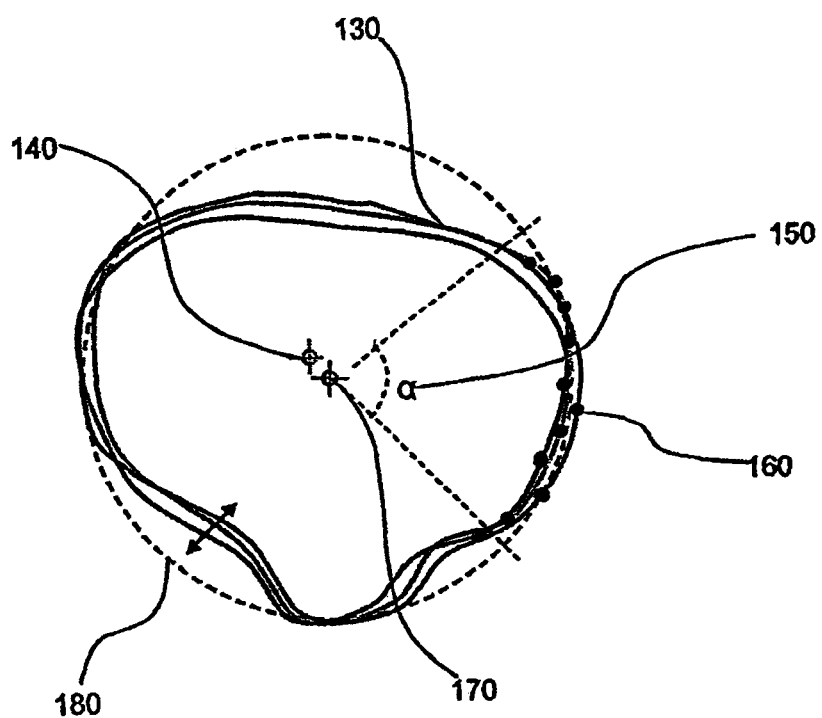
FIG. 2 illustrates the actual profile of the shell.
Figure 3:
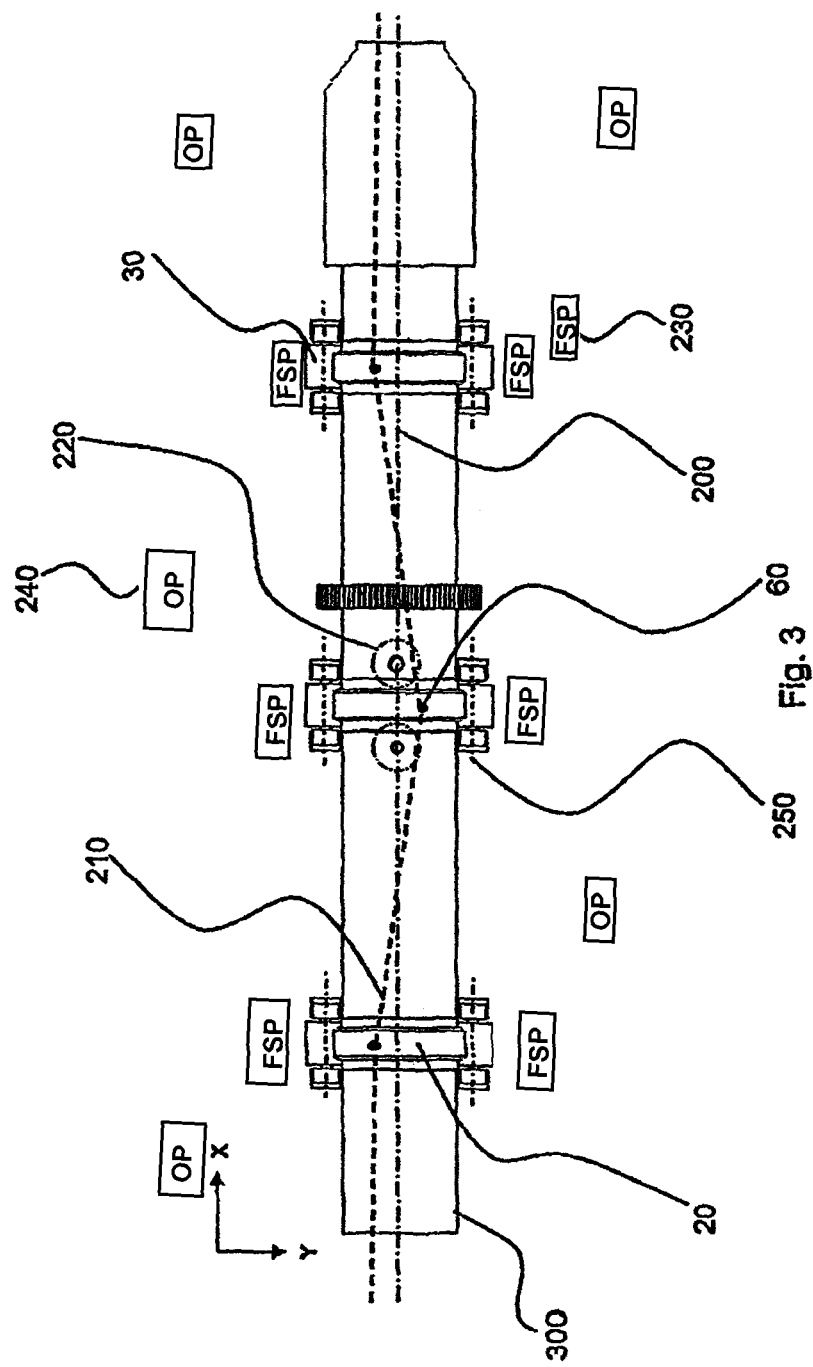
FIG. 3 illustrates the apparatus of the solution shown in FIG. 1 as a schematic drawing and an example of locating the orientation points and the free station point in the surroundings of the apparatus.

Although the above description relates to an embodiment of the invention that is in the light of present knowledge considered the most preferable, it is obvious to a person skilled in the art that the invention can be modified in many different ways within the broadest possible scope defined by the appended claims alone.

The invention claimed is:

1. A method of measuring and aligning a rotating apparatus, wherein the rotating apparatus includes a shell and at least one support ring around the shell, wherein the support ring is seated on support rollers, the method comprises:
    measuring measurement points on the shell of the rotating apparatus, directly from the surface thereof, in the axial direction on both sides of the support ring and along the circular measuring lines each at substantially equal distances from the support ring,
    calculating circular regressions from the measured measurement points for each of the circular measuring lines,
    determining a center point for each of the circular regressions,
    determining a line segment extending between the center points of the circular regressions,
    determining coordinates for a center point of the line segment, which center point corresponds to a center point of rotation of the shell,
    calculating a reference straight line as a center line of the shell,
    calculating a distance from the center point of the line segment to the reference straight line, and
    aligning the shell of the apparatus to be straight by transferring the determined center points of the line segments between the circular regressions to the calculated reference line.

2. The method according to claim 1 further comprising measuring the support rollers by creating circular measuring lines around the surface of each of the support rollers both on the upper side and the lower side, wherein the upper side being a side from which material to be treated is fed to the rotary apparatus and the lower side a side from which the material is discharged from the rotary apparatus,
    measuring measurement points along the circular measuring lines and on the surfaces of the support rollers,
    calculating circular regressions from the measurement points for the circular measuring lines of the support rollers,
    determining a center point for each of the circular regressions, and
    defining a line segment between the center points and a center point.

3. The method according to claim 1 wherein a vertical declination angles of the axis of the support rollers are measured and compared to a declination angle of the shell.

4. The method according to claim 1 wherein after the alignment a transfer of a control measurement is performed.

5. The method according to claim 1 wherein the declination angle of the center line of the rotary apparatus obtained from the reference line is compared to a designated declination angle.

6. The method according to claim 1 wherein the measuring is carried out using a device that is capable of measuring the measurement point directly from the surface of the rotary apparatus without a target sign.

7. The method according to claim 1 wherein the measurement points are measured on the shell from at least one side of the shell.

8. The method according to claim 1 wherein the measurement points are measured on the shell of the rotary apparatus is measured in the radial direction from at least two sides of the shell.

9. The method according to claim 1 wherein at least one axial thrust roller is measured by creating a circular measuring line around the surface of each at least one axial roller and measuring measurement points, circular regressions are calculated from the measurement points, center points are defined for the circular regressions, which center points illustrate the center point of the at least one axial thrust roller, and the axial thrust rollers are aligned to the same straight line with the shell of the rotary apparatus by transferring the point of rotation of the at least one axial roller, which is calculated from the circular regressions, as seen from above to the regression straight line illustrating the shell.

10. A method for measuring a rotationally symmetrical apparatus including a shell, support rings each mounted around the shell and at a different axial position along the length of the shell, and wherein support rollers support each of the support rings, the method comprising:
   for each support ring, measuring a first set of spatial dimensions between a reference position and each position of a first circular array of positions on the surface of the shell while the shell rotates, wherein the first circular array is an axial distance from a first side of the support ring;
   for each support ring, measuring a second set of spatial dimensions between a reference position and each position of a second array of circular positions on the surface of the shell while the shell rotates, wherein the second circular array is the axial distance from a second side of the support ring;
   for each of the first and second sets of spatial dimensions, calculating a circular regression based on the measured spatial dimensions;
   for each of the first and second sets of spatial dimensions, determining a center point for the calculated circular regression;
   for each support ring, calculating a ring center point based on a line segment extending through the center point for the first set of spatial dimensions and the center point of the second set of spatial dimension;
   determining an axial line for the rotationally symmetrical apparatus based on a regression line analysis of the ring center points;
   determining a spatial offset between the axial line and each of the circular regressions;
   adjusting one or more of the support rollers to reduce the spatial offset.

11. A method of measuring and aligning a rotating apparatus including a cylindrical shell and a support ring surrounding the cylindrical shell, the method comprises:
   measuring spatial positions of points on a first circle around the shell, wherein the first circle is a certain axial distance from the support ring;
   measuring spatial positions of points on a second circle around the shell, wherein the second circle is the certain axial distance from the support ring and on a side of the support ring opposite to the first circle;
   calculating a first circular regression based on the measured spatial positions of the first circle and a second circular regression based on the measured spatial positions of the second circle, and determining a center point for each of the first and second circular regressions;
   determining a spatial position of a line segment extending between the center points of the first and second circular regressions,
   determining coordinates for a center point of the line segment, which center point corresponds to a center point of rotation of the shell,
   determining a reference straight line corresponding to a center line of the shell,
   calculating a distance from the center point of the line segment to the reference straight line, and
   adjusting support rollers support the shell based on the distance between the center point and the reference straight line.

* * * * *